(12) United States Patent
Churchwell (10) Patent No.: US 6,264,461 B1
(45) Date of Patent: Jul. 24, 2001

(54) APPARATUS FOR MOLDING HARDENABLE MATERIAL

(75) Inventor: Richard Churchwell, Gilbert, AZ (US)

(73) Assignee: Intesys Technologies, Gilbert, AZ (US)

( * ) Notice: Subject to any disclaimer, the term of this patent is extended or adjusted under 35 U.S.C. 154(b) by 0 days.

(21) Appl. No.: 09/540,719

(22) Filed: Mar. 31, 2000

Related U.S. Application Data (62) Division of application No. 08/948,814, filed on Oct. 9, 1997, now Pat. No. 6,090,327.

(51) Int. Cl.[7] .................................................. B29C 45/00
(52) U.S. Cl. ............................................ 425/572; 425/588
(58) Field of Search ..................................... 425/542, 572, 425/588; 264/328.12

(56) References Cited

U.S. PATENT DOCUMENTS 5,753,155 * 5/1998 Hanusa .......................... 264/328.12

* cited by examiner

Primary Examiner—Tim Heitbrink
(74) Attorney, Agent, or Firm—Parsons & Goltry; Michael W. Goltry; Robert A. Parsons (57) ABSTRACT

An apparatus for molding hardenable material comprising a mold member having a cavity to receive hardenable material, a settling region for receiving a turbulated mix of hardenable material and a spout for discharging laminar flow into said cavity.

4 Claims, 4 Drawing Sheets

APPARATUS FOR MOLDING HARDENABLE MATERIAL

This application is a division of application Ser. No. 08/948,814, filed Oct. 9, 1997 now U.S. Pat. No. 6,090,327.

BACKGROUND OF THE INVENTION

1. Field of the Invention

This invention relates generally to the field of molding.

More particularly, this invention relates to apparatus and methods for molding hardenable material.

In a further and more specific aspect, the present invention relates to an apparatus and method for molding hardenable material.

2. Prior Art

Plastics or resins, in the modern meaning of the word, are generally defined as materials capable of being formed into usable products by heating, milling, molding, and similar processes. Resins are both natural and synthetic. However, synthetic resins comprise the foundation of an enormous range of products the growth of which shows no signs of abating.

The distinction between plastics and resins is at best arbitrary, since many of today's synthetic materials can properly be called both resins and plastics. Historically, it appears that the term resin was applied to those products primarily used as substitutes for the natural product in coating compositions, whereas the term plastic was applied to designate those compositions that involved a molding operation in their fabrication.

The characteristic ability of most plastics to soften but not melt when heated, so that their shape can be changed under mechanical stress without losing cohesion, producing a rigid new form upon cooling, is a property resulting from their molecular structure. Plastics are composed of giant molecules, known as polymers, with immensely long chains of repeating units derived from short molecules; in the case of addition polymers the short molecules are known as monomers. The chains are built up by formation of chemical bonds. When heated, these chains move apart sufficiently to permit them to slide over one another but retain their cohesiveness due to the forces that hold the polymeric chains together.

This ability to slide into new positions, which are retained on cooling, is the basis of plastics fabrication processes, such as molding or extrusion of sheets or other forms from heated granules, vacuum forming of sheets into desired forms, blowing of extruded tubes into bottles, and other processes. At higher temperatures, maximum mobility is attained allowing injection molding, a process in which the plastic is injected into a hollow casting and cooled thus taking the shape of the hollow casting. These processes require only moderately high temperatures, usually in the range of 300–400° F., and are very versatile enabling easy fabrication of an infinite variety of forms.

Injection molding normally involves rendering plastic material fluid in a chamber outside of a mold cavity and then forcing the fluid plastic into the mold cavity under pressure. The mold is cooled and split, two halves being locked during molding and opening automatically or manually after a volume of liquefied plastic has filled the mold cavity. The cooled article is then ejected from the mold cavity and the process repeated.

In its simplest form, an injection molding machine may include a heated barrel with a hydraulically operated ram, an opening in the rear of the barrel being fitted with a hopper into which measured amounts of plastic pellets or granules are fed. Falling in front of a plunger, the pellets are forced under high pressure into a heating section of the barrel, pushing out an equivalent volume of molten plastic into the mold cavity which then cools and hardens to take the shape of the mold cavity. Consistent with conventional practice, a typical mold is normally comprised of two mold halves that may be clamped together to bound a mold cavity, the two mold halves being clamped together and at a pressure that resists that exerted by the plastic entering the mold cavity. A hydraulic ram, a hydraulically operated toggle mechanism or other equivalent mechanism may achieve this. The process of injection molding plastic is generally similar to processes for injection molding other hardenable or otherwise moldable materials such as metal and perhaps other materials that may generally soften or take the form of a fluid when heated and a solid when cooled.

As previously mentioned, conventional injection molding apparatus operate to conduct pressured molten of fluid material into a mold cavity. Because the molten material is provided under pressure, the molten material is normally turbulated when it enters the mold cavity. However, if molten material is turbulently introduced into the mold cavity, it will flow discontinuously and will not fill the mold cavity at a steady rate. As a result, the molded article may not have a uniform mechanical strength over its mass and may not have sufficient pressure resistance.

Furthermore, plastic injection molding methods currently involve processes for introducing artwork during the molding process to impart the artwork with a molded article. To this end, skilled artisans normally locate films bearing selected artwork within a mold cavity prior to the molding process. The artwork, of which may be comprised of a selected artistic design, symbols, words, letters or other potential forms of indicia, is normally provided as ink located on at least one surface of the film. In this regard, a turbulent flow of molten plastic impacting the indicia on the film may distort and mar the appearance of the indicia. As a result, common methods of imparting indicia to a molded article during the injection molding process typically involve directing the artwork away from the flow of molten plastic so that the finally molded article will have the indicia on an external surface thereof. The inherent deficiency of having indicia on an external surface of a molded article is that it can become damaged over a period of time. This is especially true with molded articles that experience high levels of use or wear such as molded plastic elements found in combination with mobile phones, calculators and other similar items.

The prior art has provided a variety of apparatus and systems operative for facilitating laminar flow into a molded cavity. However, current apparatus and systems are expensive and structurally challenging to implement and construct. Furthermore, current methods of injection molding have not been able to remedy the problems associated with successfully and efficiently imparting indicia with a molded article during the injection molding process. To the contrary, existing methods that introduce molten plastic to inked surfaces or surfaces having indicia normally necessitate treatment steps to the article subsequent to the injection molding process to correct the distortion of the indicia such as trimming off portions of the article where distortion is present.

It would be highly advantageous, therefore, to remedy the foregoing and other deficiencies inherent in the prior art.

Accordingly, it is an object of the present invention to provide a new and improved mold apparatus for molding hardenable or otherwise moldable material.

Another object of the present invention is to provide a mold apparatus that is easy to construct.

And another object of the present invention is to provide a mold apparatus that is inexpensive.

Still another object of the present invention is to provide a mold apparatus that provides laminar flow of hardenable or otherwise moldable material into a mold cavity.

Yet another object of the instant invention is to provide a mold apparatus that is efficient.

Yet still another object of the instant invention is to provide a new and improved method of filling a mold cavity with hardenable or otherwise moldable material.

And a further object of the invention is to provide a method of filling a mold cavity that is easy and inexpensive to implement.

Still a further object of the immediate invention is to provide a method of filling a mold cavity that is efficient.

Yet a further object of the invention is to provide a new and improved method of molding an article from hardenable or otherwise moldable material.

And still a further object of the invention is to provide a method of molding an article that conserves and eliminates the potential waste of hardenable or otherwise moldable material throughout the molding process.

SUMMARY OF THE INVENTION

Briefly, to achieve the desired objects of the instant invention in accordance with a preferred embodiment thereof, provided is an apparatus for molding hardenable material. The apparatus is generally comprised of a mold member having a cavity to receive hardenable or otherwise moldable material, and a channel including a settling region for receiving a turbulated mix of the hardenable material and a spout or landing area for receiving the hardenable material from the settling region and discharging laminar flow of the hardenable material into the cavity. The mold member may be generally comprised of a first mold element and a second mold element opposing the first mold element to bound the cavity. In a preferred embodiment, the settling region may be comprised of an enlarged region bounding a first volume and the spout generally comprised of a narrowed region bounding a second volume. In accordance with a preferred embodiment, the first volume of the channel is generally intended to be of an extent sufficient to absorb the turbulence and sheer stress of the turbulated mix as it enters into the channel. Furthermore, the second volume of the channel is generally intended to be of an extent sufficient to provide laminar flow of the hardenable material into and through the cavity.

Consistent with the foregoing, an associated method for filling a cavity with hardenable or otherwise moldable material may also be provided. In a preferred embodiment, the present method may be comprised of the steps of providing a mold member having a cavity to receive hardenable material, providing a settling region for receiving a turbulated mix of hardenable material and providing a spout or landing area for receiving hardenable material from the settling region and for discharging laminar flow into the cavity.

Consistent with the foregoing, the present invention may further provide a method of molding an article from hardenable or otherwise moldable material. In accordance with a preferred embodiment, the present method of molding an article may be comprised of the steps of providing a mold member having a cavity to receive a laminar flow of hardenable material, providing a film having indicia carried by a major surface and locating the film in the cavity with the indicia facing and spaced from the laminar flow as it enters the cavity during the molding process.

BRIEF DESCRIPTION OF THE DRAWINGS

The foregoing and further and more specific objects and advantages of the instant invention will become readily apparent to those skilled in the art from the following detailed description of preferred embodiments thereof taken in conjunction with the drawings in which.

DETAILED DESCRIPTION OF THE PREFERRED EMBODIMENT

Figure 1:
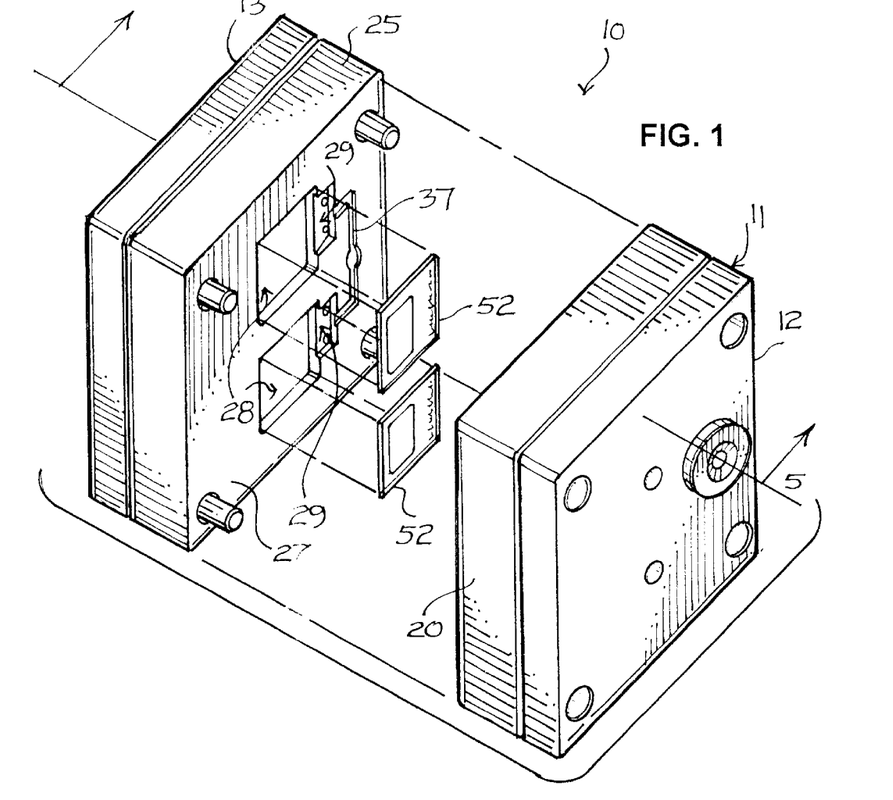
FIG. 1 illustrates a perspective view of an apparatus and system for molding one or more articles from hardenable or otherwise moldable material comprising a mold member including first and second mold elements operative for bounding one or a plurality cavities for receiving hardenable material, FIG. 1 further illustrating a plurality of films for placement with the cavities as they would appear prior to molding, in accordance with a preferred embodiment of the present invention.

Turning now to the drawings, in which like reference characters indicate corresponding elements throughout the several views, attention is first directed to FIG. 1 illustrating a perspective view of an apparatus and system 10 for molding one or more articles from hardenable or otherwise moldable material such as plastic. Consistent with the ensuing discussion, hardenable or otherwise moldable material is generally intended to include materials such as plastics or resins, metals and perhaps other similar materials that may generally soften or take the form of a fluid when heated and a solid when cooled. Regarding a preferred embodiment, hardenable or otherwise moldable material will herein collectively referred to as hardenable material and the present invention will be discussed in combination with conventional injection molding apparatus operative for forming molded articles from plastics or resins.

Regarding FIG. 1, apparatus 10 is generally comprised of a mold member 11 including a first mold element or halve 12 and a second mold element or halve 13. Consistent with conventional practice, first and second mold elements 12 and 13 may be engaged together to bound one or a plurality of mold cavities for receiving molten hardenable material from a source of hardenable material to mold an article. Those having regard toward the relevant art will readily appreciate that plastic material may be rendered fluid in a chamber outside of the one or plurality of mold cavities defined by first and second mold elements 12 and 13 and then forced into the one or plurality of mold cavities under pressure. Mold member 11 may then be cooled and first and second mold elements 12 and 13 separated and the molded article or articles ejected therefrom and the process repeated. During the molding process, first and second mold elements 12 and 13 may be held or otherwise clamped together at a pressure sufficient to resist that exerted by the molten plastic entering the mold cavity. A hydraulic ram, a hydraulically operated toggle mechanism or other similar mechanism in accordance with conventional techniques may achieve this.

Figure 2:
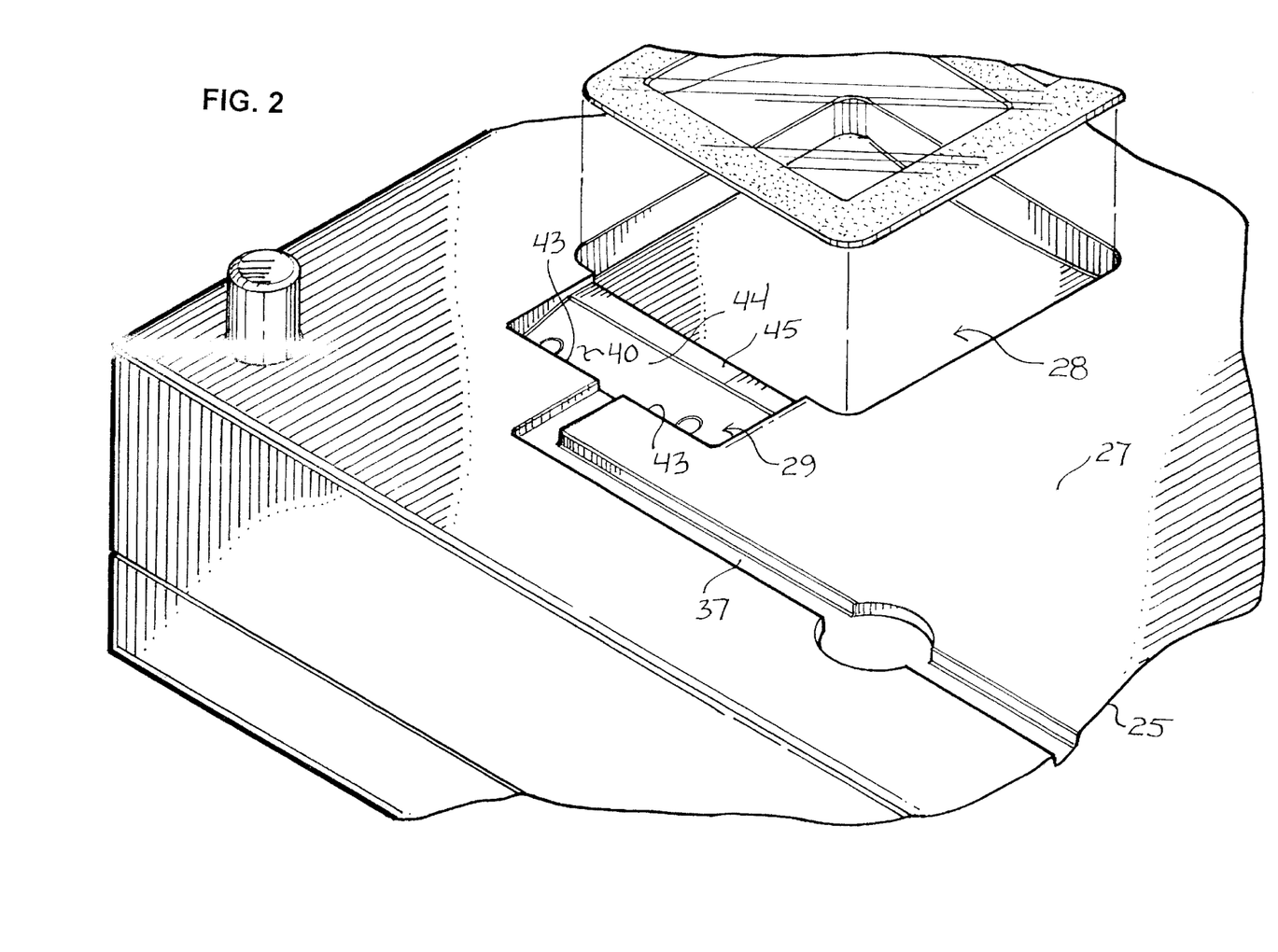
FIG. 2 illustrates an enlarged fragmented perspective view of one of the mold elements of FIG. 1.
Figure 5:
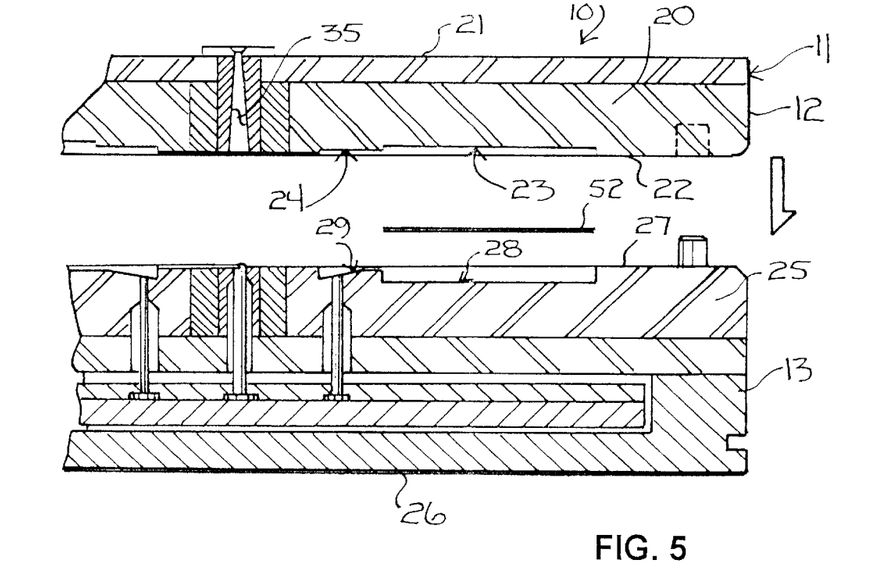
FIG. 5 illustrates a sectional view taken along line 5—5 of FIG. 1.

With attention directed to FIG. 5 illustrating a sectional view taken along line 5—5 of FIG. 1, first mold element 12 is generally comprised of a fixture 20 constructed of a predetermined and selected metal. Fixture 20 includes a first major surface 21 and an opposite second major surface 22. Fixture 20 further includes a first recess generally designated at 23 formed into second major surface 22 and a first counter recess generally designated at 24 formed on one side of, and in communication with, first recess 23. Like first mold element 12, second mold element 13 is generally comprised of a fixture 25 constructed of a predetermined and selected metal. Fixture 25 includes a first major surface 26 and an opposite second major surface 27 opposing second major surface 22 of first mold element 12. With additional reference to FIG. 2, fixture 25 further includes a second recess generally designated at 28 formed into second major surface 27 and a second counter recess generally designated at 29 formed on one side of, and in communication with, second recess 28. Second recess 28 and second counter recess 29 of second mold element 13 substantially oppose first recess 23 and first counter recess 24 of first mold element, respectively. In this regard, when first and second mold elements 12 and 13 are brought together, first and second recesses 23 and 24 will join in opposed relation and together cooperate to bound or otherwise define a cavity 30 of mold member 11, and first and second counter recesses 24 and 29 will join in opposed relation and together cooperate to bound or otherwise define a channel 31 of mold member 11 communicating with cavity 30 as clearly evidenced in FIG. 6.

Figure 6:
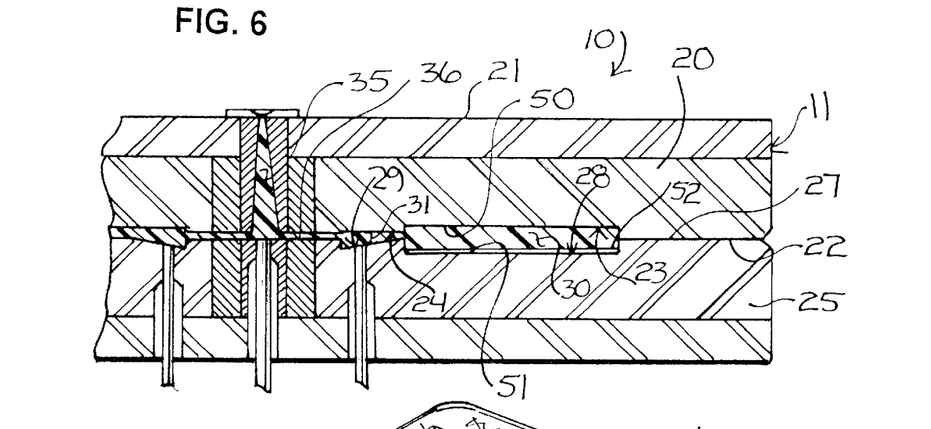
FIG. 6 illustrates a sectional view of the mold member of FIG. 1 with the first and second mold elements shown as they would appear coupled together to bound a cavity for receiving hardenable material.

With continuing reference to FIG. 6, cavity 30 of mold member 11 is operative for receiving hardenable material from a source of hardenable material. To conduct hardenable material into cavity 30, it must be coupled to a source of hardenable material in fluid communication. In this regard, fixture 20 of first mold element 12 may be provided with a conduit 35 formed therethrough operative for receiving and conducting hardenable material from a source of hardenable material for ultimate receipt into cavity 30. As shown in FIG. 6, fixtures 20 and 25 of first and second mold elements 12 and 13 are constructed or otherwise adapted so that with second major surfaces 22 and 27 engaged together, cooperate to define a runner 36 in fluid communication with conduit 35 and channel 31 operative for communicating hardenable material from conduit 35 and into channel 31 from which the hardenable material will conduct into cavity 30, further details to be presently discussed. Consistent with the nature and scope of the present invention, it makes little difference from which mold element of mold member 11 the hardenable material may be supplied. In this regard, conduit 35 may be formed with second mold element 13 if desired without departing from the nature and scope of the present invention as herein specifically described.

With momentary reference directed back to FIG. 1, fixture 25 of second mold element 13 is shown having a pair of second recesses 28 and corresponding second counter recesses 29 formed with second major surface 27. In this regard, and although not shown in FIG. 1, fixture 20 of first mold element 12 may also be constructed having a pair or first recesses 23 and corresponding counter recesses 24 formed with second major surface 22 such that with first and second mold elements 12 and 13 coupled together in the manner previously described, will cooperate with the opposing second recesses 28 and second counter recesses 29 to bound a pair of cavities 30 and corresponding channels 31. By virtue of this discussion, it will be readily understood that first and second mold elements 12 and 13 may be constructed to cooperate and bound at least one or a predetermined plurality of cavities 30 and corresponding channels 31 as specifically desired for allowing the production of one or a plurality of molded articles without departing from the nature and scope of the present invention as herein specifically desired. Furthermore, and regarding runner 36 introduced in combination with FIG. 6, fixtures 20 and 25 of first and second mold elements 12 and 13 may include opposed runner recesses 37 (shown only with second mold element 13 in FIG. 1 and FIG. 2) formed into each respective second major surface 22 and 27 such that with first and second mold elements 12 and 13 coupled together in the manner previously described, will cooperate together to bound or otherwise define runner 36 operative for communicating hardenable material from conduit 35 to channel 31 from which the hardenable material will pass into a corresponding cavity 30.

Figure 8:
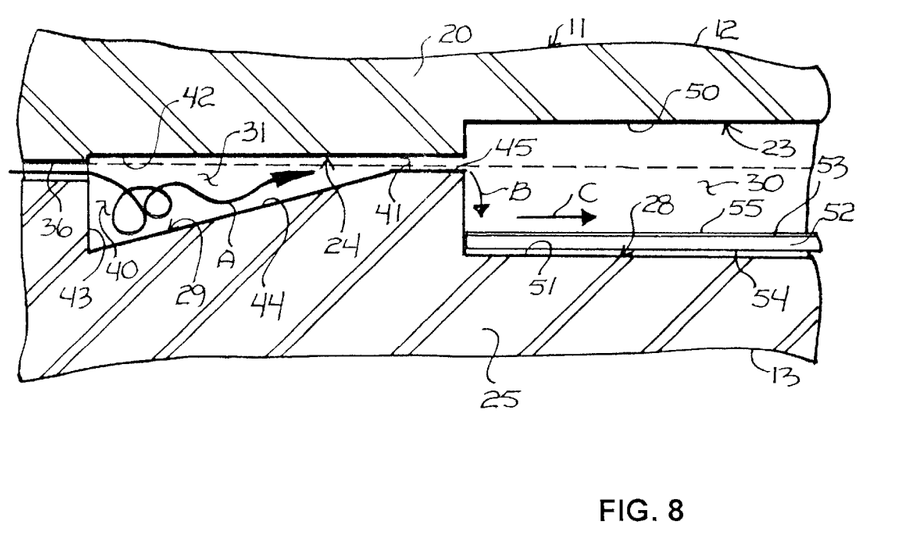
FIG. 8 is an enlarged fragmented side sectional view of the cavity of FIG. 6.

Attention is now directed to FIG. 8 illustrating an enlarged fragmented side sectional view of cavity 30 and channel 31 of FIG. 6 as they would appear with fixtures 20 and 25 of first and second mold elements 12 and 13 engaged together. As shown in FIG. 8, channel 31 is generally defined by a settling region 40 for receiving hardenable material from runner 36 in a direction indicated by the arrowed line A and a spout 41 for discharging the hardenable material from settling region 40 into cavity 30. In this regard, the hardenable material supplied through runner 36 is generally intended to be subject to high pressure and a correspondingly high flow rate in accordance with convention injection molding apparatus and methods. As a result, runner 36 may generally be considered to be a tributary through which the hardenable material flows at a substantially high rate. As a result, the hardenable material entering settling region 40 of channel 31 will be considered to be a turbulated mix of hardenable material exhibiting not only a turbulent characteristic, but also varying degrees of sheer stress.

Regarding the present invention, settling region 40 may be generally considered to be a river to receive the flow of hardenable material from the tributary or runner. In this regard, settling region 40 is generally intended to be considered enlarged relative runner 36 or otherwise encompass an enlarged volume relative runner 36 such that when the turbulated mix of hardenable material admits and falls into settling region 40 from runner 36, will operate to slow the flow rate of the hardenable material, absorb the turbulence and sheer stress of the turbulated mix of hardenable material from runner 36 and otherwise normalize and slow the flow of the hardenable material. From the settling region, the hardenable material will flow into spout 41 to facilitate the discharge of laminar flow of the hardenable material into and through cavity 30. Regarding a preferred embodiment, spout 41 is generally considered to be a narrowed region operative for spreading or otherwise evenly distributing and slowing the flow of hardenable material from settling region 40 to accomplish the discharge of laminar flow into and through cavity 30.

Regarding the structure of channel 31, channel 31 is generally defined first by a substantially planar surface 42 of first mold element 12 of which defines recess 24, planar surface 42 extending from settling region 40 adjacent runner 36 and terminating with cavity 30. Channel 31 is further defined by an endwall 43 of second mold element 13 extending downwardly from runner 36 and terminating with a substantially planar surface 44 (also shown in FIG. 2) which tapers or otherwise extends outwardly and somewhat upwardly therefrom toward cavity 30 terminating at a point spaced from cavity 30. As clearly shown in FIGS. 2 and 8, endwall 43 is squared-off and defines an enlarged squared-off end of settling region 40. To define spout 41, second mold element 13 further includes a substantially planar surface 45 (also shown in FIG. 2) contiguous with substantially planar surface 44 and extending outwardly therefrom and terminating with cavity 30. Substantially planar surface 45 of second mold element 13 is spaced from and substantially parallel to substantially planar surface 42 of first mold element along substantially the entire extent of substantially planar surface 45 to thereby cooperate with substantially planar surface 42 to form spout 41.

Consistent with the present teachings, at least spout 41 of channel 31 is preferably, but not essentially, constructed of a width of substantially the same extent of the width of cavity 30 from the point at which spout 41 meets cavity 30 to further the discharge of laminar flow into and through cavity 30 from spout 41. To this end, spout 41 will operate as a landing area to receive the flow of hardenable material from settling region 40, spread the flow of hardenable material into a thin layer and to a width of flow to correspond to substantially the entire width of cavity 30, slow and normalize the flow of hardenable material to achieve a laminar flow and then conduct the laminar flow of hardenable material into and through cavity 30. Furthermore, spout 41 and settling region 40 may alternatively, but not essentially, together be constructed of a width of substantially the same extent of the width of cavity 30 as generally defined at the pint at which spout 41 meets cavity 30 to further the discharge of laminar flow into and through cavity 30 from spout 41 and to enhance the ability of settling region 40 to absorb the turbulence and the sheer stress of the turbulated mix of hardenable material. By virtue of the construction of channel 31 and its exemplary ability to absorb the turbulence of the turbulated mix of hardenable material from runner 36 and to discharge laminar flow of hardenable material into and through cavity 30, channel 31 operates to fill cavity 30 evenly and slowly with hardenable material to thereby eliminate the common structural and functional anomalies that may otherwise occur to a molded article if formed or otherwise molded with a turbulated mix of hardenable material. Additionally, and depending upon the needs of the user, settling region 40 and spout 41 may be constructed of varying and predetermined dimensions consistent with the teachings herein.

Those having regard toward the relevant art will readily appreciate that the present invention provides an exemplary apparatus for molding an article, an exemplary method of filling cavity 30 with a laminar flow of hardenable material and an exemplary method of molding an article. Regarding the latter method, and regarding FIG. 5 and FIG. 8, recesses 23 and 28 of first and second mold elements 12 and 13 are each respectively and generally defined by a surface 50 and 51 located inwardly from each respective second major surface 22 and 27 (second major surfaces 22 and 27 not shown in FIG. 8). As best shown in FIG. 8, the point at which spout 41 opens into cavity 30 is generally shown to be at a point spaced from or otherwise elevated from or substantially superjacent relative surface 51 of recess 28 of second mold element 13. As a consequence of the foregoing physical orientation of spout 41 and surface 51 of recess 28 of second mold element 13, the discharge of laminar flow of hardenable material from spout 41 into cavity 30 will fall or otherwise descend from spout toward surface 51 in the direction generally indicated by the arrowed line B thus minimizing the initial transverse flow of the hardenable material into and through cavity 30 in the direction indicated by the arrowed line C upon impact of the hardenable material with surface 51. However, shortly after impact with surface 51, the hardenable material will flow transversely in the direction indicated by the arrowed line C to ultimately fill cavity 30 with laminar flow of hardenable material to form a molded article bearing the shape of cavity 30.

Figure 3:
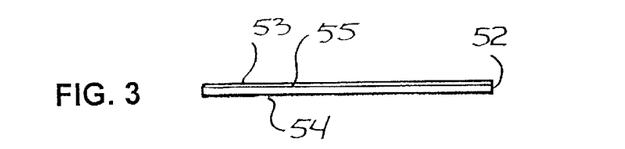
FIG. 3 illustrates a side elevational view of one of the plurality of films of FIG. 1.
Figure 4:
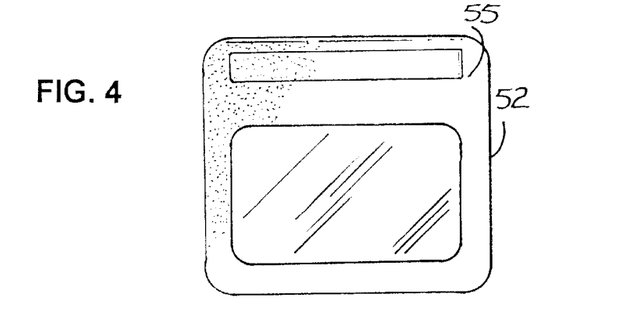
FIG. 4 illustrates a top plan view of the film of FIG. 3.

Based on the foregoing, it may be desirable for a user to impart artwork or indicia to a molded article. Consistent with a preferred method, and with continuing reference to FIG. 8, a user may provide a preformed and decorated film 52 (two of which are also shown in FIG. 1) and, by virtue of a process commonly referred to as in-mold decoration, insert film 52 into cavity 30 prior to the injection molding process. Regarding a preferred embodiment herein, and with additional reference to FIG. 3 illustrating a side elevational view of film 52 and FIG. 4 illustrating a top plan view of film 52, film 52, a product commonly found under the exemplary trademark LEXAN®, includes a predetermined and desired thickness, a first major surface 53 (not shown in FIG. 4) and a second major surface 54 (not shown in FIG. 4) having a layer 55 of artwork decoration or indicia carried or otherwise disposed thereon which may be a selected decorative design, one or more symbols and/or words, and perhaps other forms of indicia. In accordance with conventional practice, layer 55 may be generally provided in the form of an ink layer or means operative for imparting a desired artwork decoration.

Figure 7:
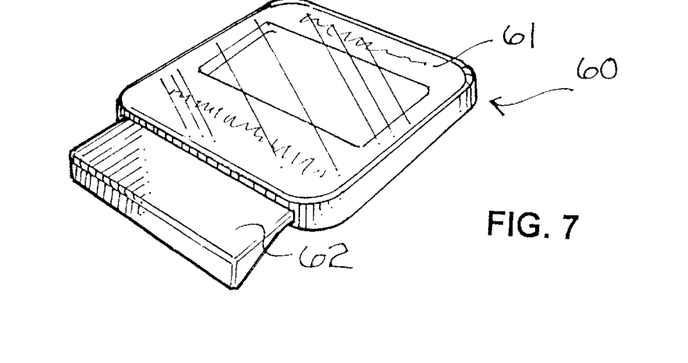
FIG. 7 illustrates a molded article as it would appear upon formation with the mold member of the present invention as first illustrated in FIG. 1.

Consistent with the desired teachings of the present invention, film 52 may be introduced with mold member 11 prior to the engagement of first and second mold elements 12 and 13 together (FIG. 5) and placed within recess 28 to rest upon surface 51 prior to the injection molding process. First and second mold elements 12 and 13 may then be engaged together with film 52 positioned and resting upon surface 51 of cavity 30 as shown in FIG. 6 and FIG. 7. In an exemplary manner of placement and orientation, film 52 may be placed within cavity 30 with layer 55 directed toward surface 50 of recess 23 and toward spout 41 and, as a consequence, toward the laminar flow of hardenable material as it would conduct into cavity 30 from spout 41. Due to the laminar flow of the hardenable material as accomplished with channel 31 as previously discussed, and with spout 41 located spaced from, superjacent to or otherwise at a location elevated from layer 55, the laminar flow of hardenable material will directly impact layer 55 generally in the direction indicated by the arrowed line B. As a consequence, and because the initial transverse flow of hardenable material in the direction indicated by the arrowed line C is minimized upon impact of the hardenable material with layer 55, the ink comprising the artwork or indicia of layer 55 will not blow-by or otherwise shift or become marred or distorted upon initial contact with the hardenable material. Momentarily after contact of layer 55 with the hardenable material, the hardenable material will then flow over layer 55 transversely in the direction indicated by the arrowed line C to fill cavity 30 to form a molded article. Although the laminar flow of hardenable material will flow over layer 55 as it fills cavity 30, the laminar flow of the hardenable material into and through cavity 30 and over layer 55 will not mar, blow-by or otherwise distort the ink comprising layer.

From the foregoing discussion, those having regard toward the relevant art will readily appreciate layer 55 will thus be sandwiched between first major surface 53 of film 52 and the hardenable material to be thereby embedded within the finally molded article. As consequence, second major surface 54 of film 52 operates to protect layer 55 from external contact thereby preventing layer 55 from diminishing or becoming subject to wear over an extended period of time.

Upon formation of the molded article and after having a chance to cool, harden and take the shape of cavity 30, first and second mold elements 12 and 13 may be disengaged and the article removed therefrom by conventional techniques, the molded article of which is generally illustrated in FIG. 7 and generally referenced by the reference character 60. As seen in FIG. 7, molded article 60 includes a body 61 bearing the shape of cavity 30 and a fin 62 extending outwardly from an edge thereof bearing the shape of channel 31. Fin 62 is considered waste material and may be easily trimmed off from body 61 by virtue of conventional techniques thus leaving the finally molded part.

The present invention has been described above with reference to a preferred embodiment. However, those skilled in the art will recognize that changes and modifications may be made in the described embodiments without departing from the nature and scope of the present invention. Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. Apparatus for converting a turbulated flow of hardenable material into a laminar flow of hardenable material comprising a channel including an enlarged square-off end and a spout, the channel for receiving the turbulated flow of hardenable material in a direction from the enlarged squared-off end for converting the turbulated flow of hardenable material into a laminar flow of hardenable material for discharge through the spout.

2. Apparatus of claim 1, wherein the channel is defined by a mold member.

3. Apparatus of claim 2, wherein the mold member comprises a first mold element having a first recess structure and an opposing second mold element having a second recess structure, the first and second recess structures cooperating to define the channel.

4. Apparatus for converting a turbulated flow of hardenable material into a laminar flow of hardenable material comprising opposing mold elements that cooperate to define a channel including an enlarged square-off end and a spout, the channel for receiving the turbulated flow of hardenable material in a direction from the enlarged squared-off end for converting the turbulated flow of hardenable material into a laminar flow of hardenable material for discharge through the spout.

\* \* \* \* \*

UNITED STATES PATENT AND TRADEMARK OFFICE
CERTIFICATE OF CORRECTION

PATENT NO.    : 6,264,461 B1
DATED         : July 24, 2001
INVENTOR(S)   : Richard Churchwell It is certified that error appears in the above-identified patent and that said Letters Patent is hereby corrected as shown below:

<u>Column 4,</u>
Line 46, insert -- 11 -- between "articles" and "from".

Signed and Sealed this

Second Day of April, 2002

Attest:

JAMES E. ROGAN
*Attesting Officer*            *Director of the United States Patent and Trademark Office*